United States Patent [19]
Bros et al.

[11] Patent Number: 5,378,267
[45] Date of Patent: Jan. 3, 1995

[54] APPARATUS FOR AIR STRIPPING CONTAMINANTS FROM WATER

[75] Inventors: David E. Bros, Edina; Sawang Notthakun, Maple Grove, both of Minn.

[73] Assignee: Carbonair Environmental Services, Inc., Maple Grove, Minn.

[21] Appl. No.: 43,264

[22] Filed: Apr. 6, 1993

[51] Int. Cl.$^6$ .............................................. B01D 19/00
[52] U.S. Cl. ........................................ 96/168; 96/189; 96/202; 96/215
[58] Field of Search ................. 95/223, 243, 245, 263, 95/210, 246, 264, 265; 96/158, 202, 168, 215, 157, 170, 171, 179, 189; 55/223, 257.1, 233, 219, 227, 259; 137/397, 398, 451

[56] References Cited

U.S. PATENT DOCUMENTS

| | | | |
|---|---|---|---|
| 523,326 | 7/1894 | Colles | 55/227 X |
| 1,529,884 | 3/1925 | Hall | 96/168 |
| 1,810,410 | 6/1931 | Alldredge | 55/227 X |
| 2,471,571 | 5/1949 | Kimmell | 96/168 |
| 2,866,516 | 12/1958 | Shepherd | 55/227 X |
| 2,934,141 | 4/1960 | Ikavolko | 96/170 X |
| 3,338,029 | 8/1967 | Warfield, Jr. | 55/227 X |
| 3,410,540 | 11/1968 | Bruckert | 261/114.1 X |
| 3,434,701 | 3/1969 | Bauer . | |
| 3,807,143 | 4/1974 | Dunn | 55/222 |
| 3,887,665 | 6/1975 | Mix et al. | 261/114.1 |
| 4,184,857 | 1/1980 | Iijima et al. | 96/189 X |
| 4,187,088 | 2/1980 | Hodgson | 96/171 |
| 4,265,167 | 5/1981 | Mojonnier et al. | 55/240 X |
| 4,341,640 | 7/1982 | Landis | 55/38 X |
| 4,358,296 | 11/1982 | Notardonato et al. | 96/202 X |
| 4,412,924 | 11/1983 | Feather . | |
| 4,556,522 | 12/1985 | Wilson . | |
| 4,566,522 | 1/1986 | Flak et al. . | |
| 4,608,163 | 8/1986 | Yohe et al. . | |
| 4,621,945 | 11/1986 | Schafer et al. | 137/451 X |
| 4,663,089 | 5/1987 | Lowry et al. . | |
| 4,684,379 | 8/1987 | Gambrell | 55/227 |
| 4,869,832 | 9/1989 | Lamarre . | |
| 4,954,147 | 9/1990 | Galgon . | |
| 4,954,294 | 9/1990 | Bannon | 261/114.1 |
| 5,020,567 | 6/1991 | Praulx | 137/451 X |
| 5,045,215 | 7/1987 | Lamarre . | |
| 5,084,175 | 1/1992 | Hoffmeier | 210/344 |
| 5,102,583 | 4/1992 | Bannon | 261/114.1 |
| 5,120,330 | 6/1992 | Notordanato et al. | 96/202 X |
| 5,122,166 | 6/1992 | Hyrcyk et al. | 96/189 X |
| 5,135,551 | 8/1992 | Fielding | 55/233 |
| 5,240,595 | 8/1993 | Lamarre | 96/202 X |
| 5,259,931 | 11/1993 | Fox | 55/227 X |

FOREIGN PATENT DOCUMENTS

| | | | |
|---|---|---|---|
| 567203 | 12/1958 | Canada | 96/158 |
| 2803083 | 8/1978 | Germany | 96/158 |
| 383688 | 5/1973 | U.S.S.R. | 96/202 |
| 1219869 | 3/1986 | U.S.S.R. | 96/202 |

OTHER PUBLICATIONS

"Pre-Engineered Remediation Packages", 1992 Carbonair.

"The Alternative to Packed Tower Aeration for Public Water Supplies", the Stripper, Multi-Staged diffused Bubble aeration System from Lowry Engineering, Inc., U.S. Pat. No. 4,663,089.

"Inside a Trayed Distillation Column", Tak Yanagi, Fractionation Research, Inc., Chemical Engineering, Nov. 1990.

"Air Stripping without packing or blowers", Hazleton Environmental Products, Inc., Bulletin 101.005 Rev 9/9?.

"Treatment, Waste Management and Cost for Removal of Radioactivity from Drinking Water", George W. Reid, Peter Lassovszky, Steven Hathaway, Health Physics, vol. 48, No. 5 (May), pp. 671–694, 1985.

"Removal of Radon from Water Supplies", Jerry D. Lowry, M. ASCE, Jeffrey E. Brandow, Journal of Environmental Engineering, vol. 111, n0.4, Aug., 1985.

"Perry's Chemical Engineers' Handbook Sixth Edition", Robert H. Perry, Don W. Green, James O. Maloney, Rev. ed. of:Chemical Engineers' Handbook, 5th ed. 1973.

Advertising Brochure: "Voc and Radon Removal from Water".

Advertising Brochure: "We have the answers", by Carbonair.

*Primary Examiner*—Robert Spitzer
*Attorney, Agent, or Firm*—Vidas, Arrett & Steinkraus

[57] ABSTRACT

A modular air stripper apparatus comprised of a plurality of stacked air stripping chambers.

19 Claims, 3 Drawing Sheets

APPARATUS FOR AIR STRIPPING CONTAMINANTS FROM WATER

BACKGROUND OF THE INVENTION

Field of the Invention

This invention relates to an apparatus of new design for the removal of volatile organic compounds (VOC) from water by air stripping.

Current apparatus used for the decontamination of water and other liquids (herein generally level water) by air stripping include the well known stripping towers and apparatus of the type shown in the following U.S. Pat. Nos. 4,869,832; 4,954,147; 4,663,089; and 5,045,215, just to mention a few.

SUMMARY OF THE INVENTION

The present invention is directed to a new simplified modular air stripper design which is easy to manufacture and service. The design is readily adaptable to a variety of sizes and includes a plurality of stacked stripping chambers, each of which includes an apertured floor, with opposite ends defining a flow path therebetween for water undergoing stripping. The water is introduced into one end of the top chamber and flows across that chamber to the other end and down to the lower chamber through down comers. The water thus travels in a back and forth direction as it moves from the top chamber to the bottom chamber. Air is forced through each chamber starting in the bottom chamber and exiting out the top chamber. As the air bubbles through the water it strips the VOC's from the water. Stripped water exits the apparatus from the bottom chamber.

BRIEF DESCRIPTION OF THE DRAWINGS

A detailed description of the invention is hereafter described with specific reference being made to the drawings in which.

DESCRIPTION OF THE PREFERRED EMBODIMENTS

The air stripper of this invention allows for low profile design which is simplified, flexible and capable of high performance.

In these units the water and air are contacted in stepwise fashion on multiple chamber flows. The water enters at the top and flows across each chamber floor. The air passes upwards through openings in the chamber floors, then bubbles through the water to form "a surface of foam" which provides extreme turbulence and excellent volatilization. Since the water flows horizontally across each chamber floor, the traveling path length of water and the required removal efficiency can be achieved by increasing either or both the number and/or length of the chambers. Consequently, the units provide lower tower height than conventional packed towers.

Another advantage of these units is that air and blower power consumption are more effectively utilized since a single air stream passes through every chamber before exiting the unit. As a result of minimal air flows, the VOC's are concentrated and can be more effectively removed by later treatment of the air such as by vapor phase carbon or the like. Lower tower height yields numerous other advantages: modular design configurations, rapid installation, easy integration, inconspicuous appearance, easy shipping, easy maintenance and portability.

Referring to the Figures, preferred apparatus 10 is shown for air stripping water of VOC's in accordance with this invention. Apparatus 10 includes a stacked series of intermediate stripping chambers 12, a top chamber 14 and a bottom chamber 16. The chambers as shown are preferably of rectangular parallelepiped configuration although other shapes and geometrics may be used. Fabricator is preferably of stainless steel or plastic for durability.

Figure 7:
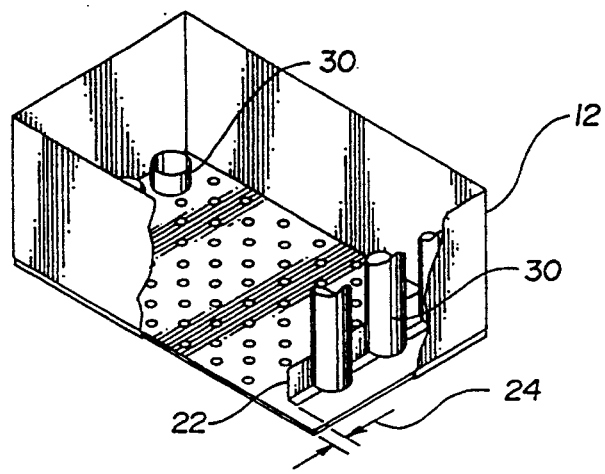
FIG. 7 is a perspective view of weir location to sidewall.

Each of the intermediate chambers 12 includes a floor 18 which is apertured with numerous perforations or holes 20. Holes 20 are preferably on the order of between $\frac{1}{4}$ inch and $\frac{1}{2}$ inch in diameter. Hole size in any particular design will depend on flow rates of water and volume of air. The holes need to be sized to prevent weeping, i.e., the dropping of contaminated water through the holes. As shown in FIG. 7, mounted on the floor 18 at the inlet end of each chamber 12 is a weir 22 of a predetermined height and length. It is sized so as to provide a gap 24 between the ends thereof and the sides 12a of the chambers. This gap allows water to flow back into area 26 in each chamber 12 to flood it and cut off an air path or escape through the downcomers.

A treatment area 12b is provided between the weir and the downcomers on floor 18 of each chamber 12. The height of weirs 22 is less than chambers height and is determined by water flow. Their height provides a flat uniform water depth in each chamber for uniform pressure drop through each floor 18.

Figure 3:
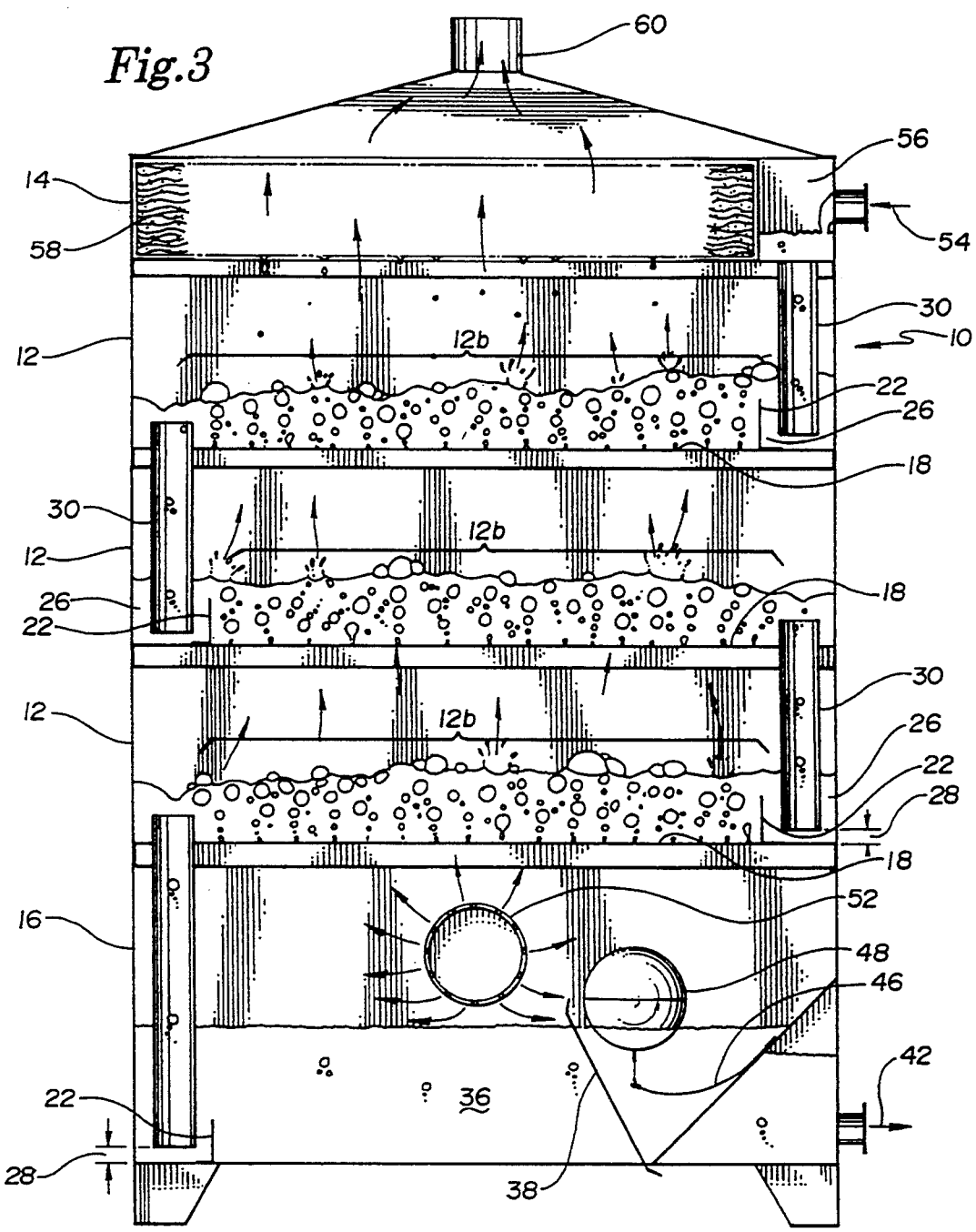
FIG. 3 is a transverse sectional view taken along line 3—3 of FIG. 1.
Figure 5:
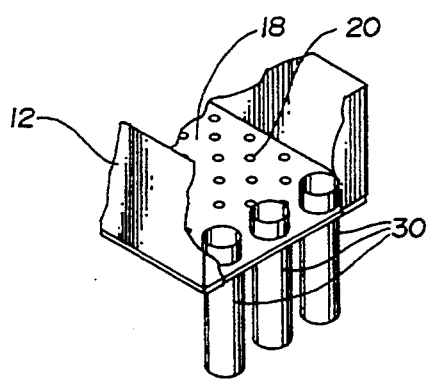
FIGS. 5 and 6 are perspective views with parts cutaway showing alternate downcomer designs for the apparatus.
Figure 6:
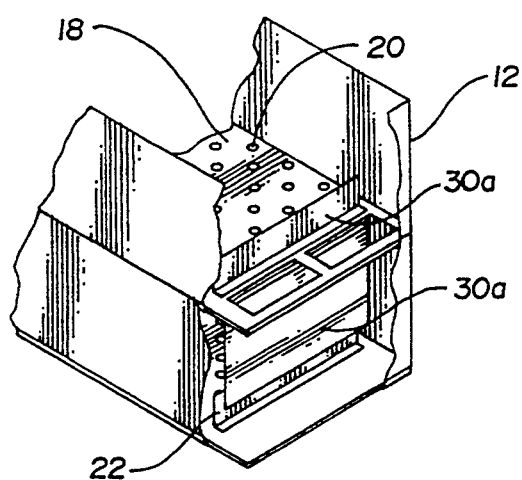
Figure 8:
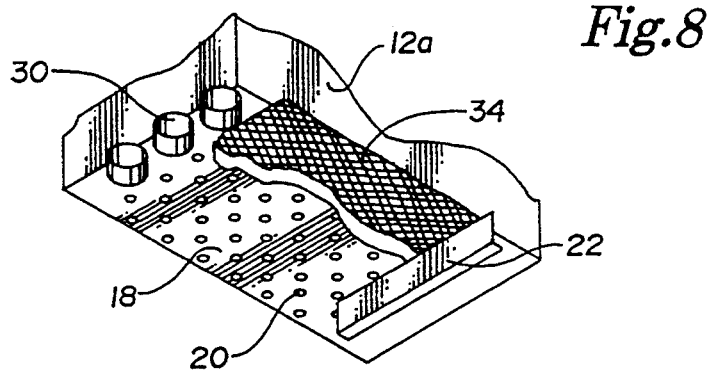
FIG. 8 is a perspective view of screen placement in process area.

As can be seen in FIGS. 7 and 8, the weir 22 is spaced a small distance from the end of the chamber to provide, respectively, inlet area 26 (best seen in FIG. 3). Into each inlet area 26 from the chamber immediately above is a downcomer arrangement such as the series of multiple pipes 30 (best seen in FIG. 5) or which may consist of a single conduit 30a as shown in the alternate arrangement of FIG. 6 or any configuration suitable to convey water to the chamber below. The downcomers or pipes 30 have a predetermined height above chamber floor. This height creates a barrier type weir to hold a level of water in the process area 12b. Each of the pipes 30 are spaced above the floor 18 of each chamber below 12 to provide a gap the size of which is determined according to the following ratio relationship: pipe 30 circumference × gap height 28 is Proportional to the Pipe's Cross Sectional Area.

An optional screen 34 (best seen in FIG. 8) may be included in each chamber 12 lying on floor 18 covering the process area 12b. The use of screen 34 facilitates cleaning of the stripper chambers, lessens weeping of process water, disperses and reduces air bubble size. Screen such as wire cloth or perforated metal can be used. Mesh size is determined by air flow rate, water depth in chamber 12b and hole size.

The base or bottom chamber 16 functions to collect treated water 36 which has flowed downwardly through the stripping chambers 12. The water enters through the downcomer pipes 30 from the stripping chamber 12 immediately above. Chamber 16 includes a modulating outlet valve 38. The valve can be set at a slant (as shown in FIG. 3) or placed horizontally on the floor of chamber 16 or vertically against end wall of chamber 16. The valve terminates outside chamber at 42.

Figure 4:
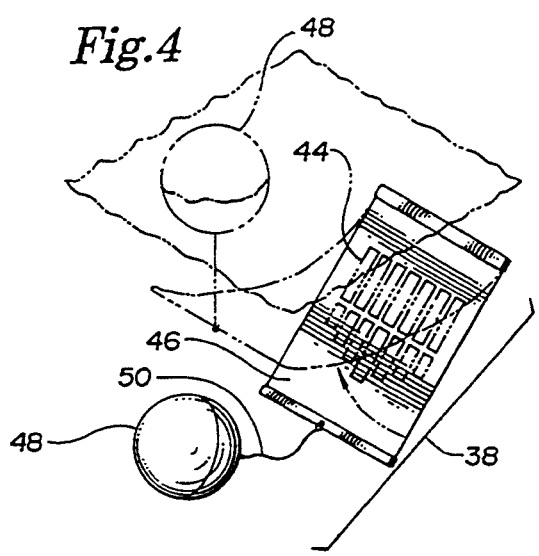
FIG. 4 is a view in phantom showing the water outlet arrangement for the apparatus.

For operation of the apparatus, it is necessary to maintain a predetermined amount of water in chamber 16 before allowing any to flow out of the chamber. A flooded outlet 42 is necessary to block air and pressure from escaping through that outlet. To maintain a certain level of water in chamber 16 a valving system 38 is arranged as shown at FIGS. 3 and 4 which is comprised of a flexible elastomer seal flap 46 or the like, which functions as a valve door to cover the outlet slots 44 and a float 48 which is attached to flap 46 as shown by a wire 50 or the like. Such a valving system is sized and configured depending on chamber size, flow rate and outlet location to collect the necessary predetermined amount of water before opening the outlet and match the outlet flow to the inlet flow without allowing air to escape.

Figure 1:
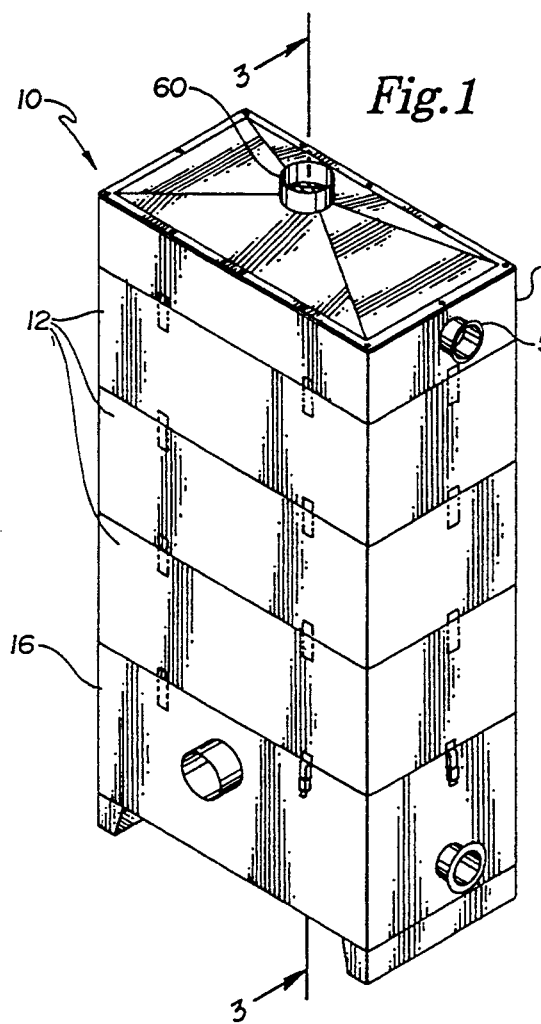
FIG. 1 is a perspective view of an air stripper apparatus constructed in accordance with a preferred embodiment of the present invention.
Figure 2:
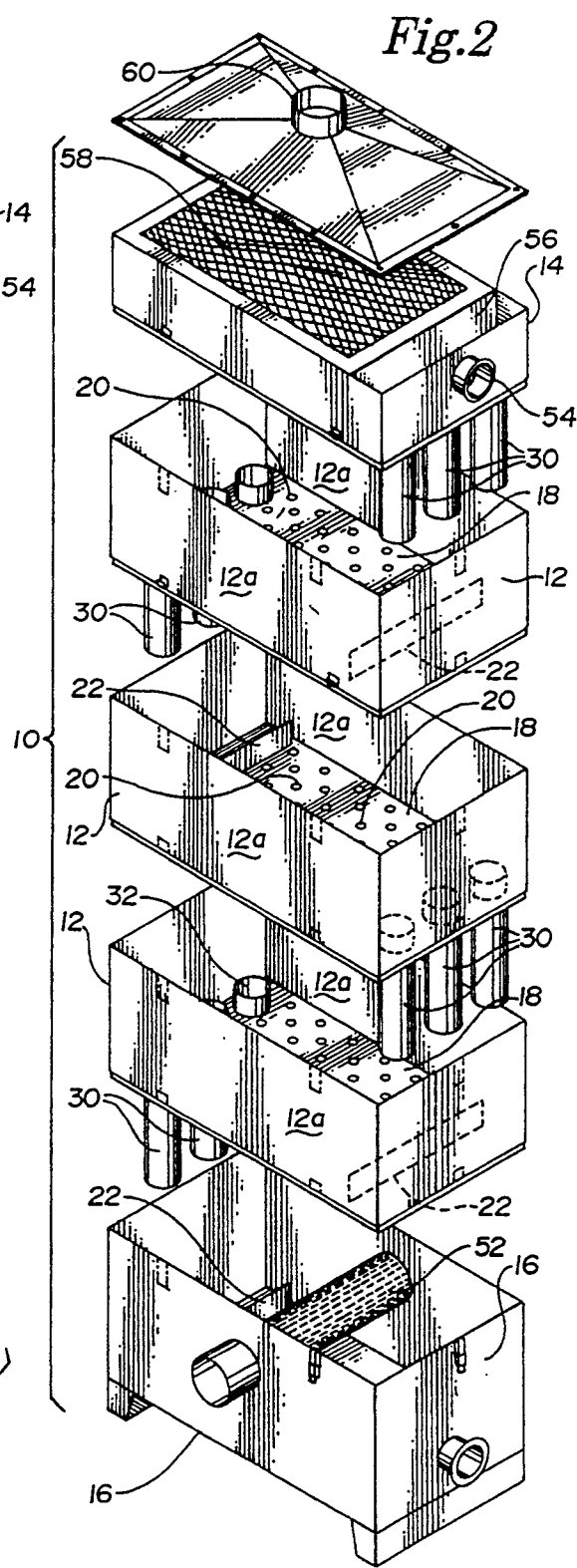
FIG. 2 is an exploded view of the apparatus of FIG. 1.

Chamber 16 also includes an air inlet means such as slotted manifold 52 as best seen in FIGS. 2 and 3, to which a source of pressurized air is connected such as a blower (not shown).

Referring now to FIG. 3 and to the top chamber 14 as shown therein, the chamber includes an inlet port 54 which allows for the introduction to the apparatus of water to be treated. The water flows into chamber 14 as shown in area 56, into downcomer pipes 30 and into the first intermediate stripping chamber 12 and hence downwardly through the apparatus, as will be described further hereinbelow with reference to the operation of the apparatus.

Also included in chamber 14 is a demister 58, which may be of fiberglass, plastic or metal mesh. The purpose of the demister is to collect the entrained liquid from the air stream and prevent it from escaping the apparatus along with the contaminated air. Provision for the passage of contaminated air is by outlet 60 on top of chamber 14. Pressurized air rising through the apparatus can upon exiting at outlet 60 be passed to a variety of further treatment means.

OPERATION

Water herein means any liquid, contaminated with VOC's and the like is pumped or otherwise introduced to the apparatus through inlet 54. It flows into chambers 12 through the downcomer arrangement, over the weir 22 at the inlet end and establishes a cross-flow on the floor of the chamber to the other or outlet end or area where it again passes downwardly to the next lower chamber 12 to flow in the opposite direction across the chamber floor and so on until it enters the bottom or collection chamber 16.

Pressurized air is introduced into the apparatus through manifold 52 in bottom chamber 16. The air flows upwardly through the apertured floors 18 of the stripping chambers 12 where it flows through the water passing over the floors, stripping and picking up VOC's from the water as it passes upwardly through the apparatus chambers. The pressure is high enough to help prevent weeping through the apertures.

When the air reaches the top chamber 14 it passes through the water demister 58 and through outlet 60 carrying the VOC's stripped from the water.

Meanwhile, the treated water collected in chamber 16 reaches a level therein at which it raises float 48 to open outlet 38 and allow passage of water out of the apparatus.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. Apparatus for decontaminating by air stripping water containing VOC's, comprising a plurality of stacked stripping chambers, including a top chamber into which water to be treated is first admitted to the apparatus, a bottom chamber from which treated water is discharged and at least one intermediate chamber, the top chamber having a closed top and the bottom chamber having a closed bottom; the top and intermediate chambers having floors containing a plurality of apertures therein allowing air to flow up from the chamber below and spaced means defining in each chamber water inlet and outlet areas for admitting water to be treated to the chamber and establishing cross-flow of water therebetween across the chamber floors, the spaced means being constructed and arranged so as to direct the cross-flow in opposite directions with respect to adjacent chambers; all of the chambers, except for the bottom one, including a pair oppositely disposed spaced weirs positioned on the chamber floor between the inlet and outlet areas to define a treatment area at the apertured chamber floor whereby the cross-flow is from one weir (inlet) to the other weir in each chamber in passing from the inlet area to the outlet area, the weirs extending vertically a predetermined height which is less than the height of the chamber and the inlet weir extending lengthwise over the floor a predetermined distance which is short of contacting the sides of the chamber thereby establishing a gap at each end of each inlet weir between the weir and the side of the chamber; means for admitting pressurized air to the lower chamber; the bottom chamber being constructed and arranged to collect a predetermined amount of treated water and including valving means and an outlet for releasing treated water after a predetermined amount has been collected, and the top chamber further including means for capturing water droplets entrained in the air stream and allowing the air to exit the apparatus.

2. The apparatus of claim 1 wherein the valving means comprises a seal flap positioned over the outlet to close the outlet and open the outlet when the flap is raised and there is further included a float attached to the flap to raise the flap when the predetermined amount of water has collected in the bottom chamber; the amount of water discharged from the apparatus being dependent upon the position of the float whereby said amount of water discharged equals the input water flow, modulating a consistent water flow rate through the apparatus.

3. The apparatus of claim 1 wherein the means defining the inlet area for each intermediate chamber includes downcomer means extending downwardly into the chamber from the chamber above, the downcomer means defining a gap between its lower end and the chamber floor which is lower in height than the weir associated therewith.

4. The apparatus of claim 3 wherein the downcomer means comprises a conduit means for directing water flow downwardly from one chamber to another.

5. The apparatus of claim 4 wherein the conduit means is a pipe constructed and arranged so that its size, circumference, cross sectional area and distance from the chamber floor satisfy the ratio relationship: circumference x gap height is proportional to the cross sectional area of the pipe.

6. The apparatus of claim 1 wherein each intermediate chamber includes screen means laying on the floor between the weirs.

7. The apparatus of claim 1 wherein the stacked chambers are generally of a rectangular parallelepiped configuration, the weirs being located at opposite ends of the chambers.

8. The apparatus of claim 7 wherein the means defining the inlet area for each intermediate chamber includes downcomer means defined by a depending wall element spaced from an end wall of the chamber and positioned between the end wall and the weir, the depending wall element terminating a predetermined distance from the floor to form a gap.

9. Air stripping apparatus comprising a plurality of interconnected stripping chambers wherein at least one of the chambers includes an apertured floor for admitting air into the chamber and also includes a pair of spaced weirs (an inlet weir and an outlet weir) positioned on the floor and defining a flow path therebetween for water to be stripped, the weirs being of lesser dimension in height than the chamber and the inlet weir is lesser in width than the chamber so as to provide gap-like arrangements at each end of the inlet weir.

10. The apparatus of claim 9 wherein the chambers are generally of a rectangular parallelepiped configuration and the weirs are disposed toward the ends thereof.

11. The apparatus of claim 10 further comprising at least one intermediate chamber and wherein an inlet area of each intermediate chamber is defined by a downcomer means extending downwardly into each said intermediate chamber from the chamber above, the downcomer means defining a gap between its lower end and the floor of the chamber, said gap being lower in height than the weir associated therewith.

12. The apparatus of claim 11 wherein the downcomer means comprises a conduit means for directing water flow downwardly from one chamber to another.

13. The apparatus of claim 12 wherein the conduit means comprises a pipe, said pipe being circular or rectangular in cross-section and further being constructed and arranged so that its size, circumference, cross sectional area and distance from the chamber floor satisfy the relationship: circumference x gap height is proportional to the cross sectional area of the pipe.

14. The apparatus of claim 11 further comprising a valving means and an outlet for releasing treated water after a predetermined amount has been collected, said valving means comprising a seal flap positioned over the outlet to close the outlet and open the outlet when the flap is raised, and there is further included a float attached to the flap to raise the flap when the predetermined amount of water has collected in the bottom chamber.

15. The apparatus of claim 10 further comprising a top chamber, a bottom chamber and at least one intermediate chamber and wherein the top chamber and any intermediate chambers include screen means layered on the floor between the weirs.

16. In an air stripping apparatus including a plurality of stacked stripping chambers wherein pressurized air is introduced into a bottom chamber and water to be stripped is introduced into an upper chamber, the improvement comprising a chamber constructed and arranged to collect a predetermined amount of stripped water and including means for releasing water after the predetermined amount is collected, comprising a float-operated outlet cover and a float attached thereto for raising and lowering the cover relative to an outlet in the collecting chamber.

17. In an air stripping apparatus including at least one stripping chamber and a collecting chamber positioned under the stripping chamber, the improvement comprising means for controlling the release of fluid from the collecting chamber after collection of a predetermined amount thereof, comprising a float-operated outlet cover and a float attached thereof for raising and lowering the cover relative to an outlet in the collecting chamber.

18. In an air stripping apparatus including at least one stripping chamber and a collecting chamber positioned under the stripping chamber, the improvement comprising means for controlling the release of fluid from the collecting chamber after collection of a predetermined amount thereof, said control means being positioned within the collecting chamber, and further including a float operated flap.

19. Air stripping apparatus including at least one stripping chamber having an apertured floor for admitting air into the chamber and having spaced means defining water inlet and outlet areas for establishing cross-flow of water therebetween across the chamber floor; and including a pair of oppositely disposed spaced weirs positioned on the chamber floor between the inlet and outlet areas to define a treatment area whereby the cross-flow is from one weir to the other, the weirs extending vertically a predetermined height which is less than the height of the chamber; wherein the weir associated with the inlet extends lengthwise over the chamber floor a distance which is short of contacting the sides of the chamber thereby establishing a gap at each end of the weir between the weir and the chamber sides.

* * * * *

UNITED STATES PATENT AND TRADEMARK OFFICE
CERTIFICATE OF CORRECTION

PATENT NO. : 5,378,267
DATED : January 3, 1995
INVENTOR(S) : Bros et al.

It is certified that error appears in the above—identified patent and that said Letters Patent is hereby corrected as shown below:

Column 1, line 12 delete "level".

Signed and Sealed this

Eighteenth Day of April, 1995

Attest:

BRUCE LEHMAN

Attesting Officer

Commissioner of Patents and Trademarks